United States Patent
Iyer

(10) Patent No.: US 9,956,522 B2
(45) Date of Patent: May 1, 2018

(54) MOISTURE REMOVAL FROM WET GASES

(71) Applicant: NRGTEK, INC., Orange, CA (US)

(72) Inventor: Subramanian Iyer, Orange, CA (US)

(73) Assignee: NRGTEK, INC., Orange, CA (US)

(*) Notice: Subject to any disclaimer, the term of this patent is extended or adjusted under 35 U.S.C. 154(b) by 0 days. days.

(21) Appl. No.: 15/288,257

(22) Filed: Oct. 7, 2016

(65) Prior Publication Data
US 2018/0043300 A1 Feb. 15, 2018

Related U.S. Application Data

(63) Continuation-in-part of application No. 15/271,175, filed on Sep. 20, 2016, now Pat. No. 9,782,719.
(Continued)

(51) Int. Cl.
*B01D 53/26* (2006.01)
*B01D 53/28* (2006.01)
(Continued)

(52) U.S. Cl.
CPC ......... *B01D 53/28* (2013.01); *B01D 53/1425* (2013.01); *B01D 53/263* (2013.01);
(Continued)

(58) Field of Classification Search
CPC .. B01D 53/28; B01D 53/1425; B01D 53/263; B01D 2252/2026; B01D 2252/2028; B01D 2252/20415; B01D 2252/20421
See application file for complete search history.

(56) References Cited

U.S. PATENT DOCUMENTS

| 3,403,522 A | 10/1968 | Henry |
| 4,279,628 A | 7/1981 | Wymer et al. |

(Continued)

FOREIGN PATENT DOCUMENTS

| EP | 0571997 A1 | 12/1993 |
| EP | 2700440 A2 | 2/2014 |

(Continued)

OTHER PUBLICATIONS

PCT Form ISA237, Written Opinion, PCT/US2017/044903 (dated Oct. 18, 2017).
(Continued)

*Primary Examiner* — Cabrena Holecek
(74) *Attorney, Agent, or Firm* — UltimatEdge IP Law Group, P.C.; Dean G. Stathakis; Vito A. Canuso, III

(57) ABSTRACT

Methods of reducing the water content of a wet gas are presented. In one case, the method includes exposing the gas to an amine-terminated branched polymer solvent to remove a substantial portion of the water from the wet gas, exposing the diluted solvent to carbon dioxide to phase separate the solvent from the water, and regenerating the solvent for reuse by desorbing the carbon dioxide by the application of heat. In another case, the method includes exposing the gas to a cloud-point glycol solvent to remove a substantial portion of the water from the wet gas, heating the diluted solvent to above a cloud point temperature for the solvent so as to create a phase separation of the solvent from the water so as to regenerate the solvent for reuse, and directing the regenerated solvent to a new supply of wet gas for water reduction.

12 Claims, 3 Drawing Sheets

Related U.S. Application Data

(60) Provisional application No. 62/372,762, filed on Aug. 9, 2016.

(51) Int. Cl.
  B01D 53/86 (2006.01)
  B01D 53/14 (2006.01)

(52) U.S. Cl.
  CPC ........... *B01D 2252/2026* (2013.01); *B01D 2252/2028* (2013.01); *B01D 2252/20415* (2013.01); *B01D 2252/20421* (2013.01)

(56) References Cited

U.S. PATENT DOCUMENTS

| | | | |
|---|---|---|---|
| 4,466,946 A | 8/1984 | Goddin, Jr. et al. | |
| 4,609,384 A | 9/1986 | Ranke et al. | |
| 5,277,884 A | 1/1994 | Shinnar et al. | |
| 6,322,612 B1 | 11/2001 | Sircar et al. | |
| 6,391,205 B1 | 5/2002 | McGinnis | |
| 6,849,184 B1 | 2/2005 | Lampi et al. | |
| 7,314,847 B1 | 1/2008 | Siriwardane | |
| 7,740,689 B2 | 6/2010 | Fradette et al. | |
| 7,955,506 B2 | 6/2011 | Bryan et al. | |
| 8,021,549 B2 | 9/2011 | Kirts | |
| 8,021,553 B2 | 9/2011 | Iyer | |
| 8,083,942 B2 | 12/2011 | Cath et al. | |
| 8,133,307 B2 | 3/2012 | Suzuki | |
| 8,252,091 B2 | 8/2012 | Anand et al. | |
| 8,398,757 B2 | 3/2013 | Iijima et al. | |
| 8,551,221 B2 | 10/2013 | Wolfe | |
| 8,647,421 B2 | 2/2014 | Yonekawa | |
| 8,702,846 B2 | 4/2014 | Menzel | |
| 9,216,917 B2 | 12/2015 | Carmignani et al. | |
| 2009/0130411 A1 | 5/2009 | Chang et al. | |
| 2009/0294366 A1 | 12/2009 | Wright et al. | |
| 2010/0303693 A1 | 12/2010 | Leppin | |
| 2010/0313752 A1 | 12/2010 | Powell et al. | |
| 2011/0186441 A1 | 8/2011 | LaFrancois et al. | |
| 2012/0060686 A1* | 3/2012 | Kortunov | B01D 53/1475 95/26 |
| 2012/0085232 A1 | 4/2012 | Sethna et al. | |
| 2012/0171095 A1 | 7/2012 | O'Brien et al. | |
| 2012/0211423 A1 | 8/2012 | Kim et al. | |
| 2012/0222442 A1 | 9/2012 | Dieckmann et al. | |
| 2013/0139695 A1 | 6/2013 | Chang et al. | |
| 2013/0305922 A1 | 11/2013 | Metzger et al. | |
| 2015/0122727 A1 | 5/2015 | Kamik et al. | |
| 2016/0046360 A1 | 2/2016 | Kim et al. | |

FOREIGN PATENT DOCUMENTS

| | | | |
|---|---|---|---|
| WO | 2015068160 A1 | 5/2015 | |
| WO | WO-2015068160 A1 * | 5/2015 | ............. A61L 27/26 |

OTHER PUBLICATIONS

USPTO Non-Final Office Action, U.S. Appl. No. 15/271,175 (dated Aug. 10, 2017).

USPTO Non-Final Office Action, U.S. Appl. No. 15/272,406 (dated Jan. 25, 2018).

Yang, et al., Efficient SO2 Capture by Amine Functionalized Peg, Phys. Chem. Chem. Phys. 15: 18123-18127 (2013).

Zhu, Lewis-Base Polymers for Modifying Absorption and Desorption Abilities of Silica Supported, Amine Based Solid carbon Dioxide Capture Materials, M.S. Thesis, University of Missouri-Columbia (Dec. 2014).

* cited by examiner

MOISTURE REMOVAL FROM WET GASES

The present application is a continuation-in-part of non-provisional application Ser. No. 15/271,175 filed Sep. 20, 2016, which claims priority to provisional application Ser. No. 62/372,762, filed Aug. 9, 2016, the entire contents of each of which are incorporated herein in its entirety by reference.

BACKGROUND

Natural gas typically contains some amount of moisture. In many applications, the removal or significant reduction of moisture, i.e., gas dehydration, is important. While several methods exist for gas dehydration, including Pressure Swing Absorption (PSA), Temperature Swing Absorption (TSA), solid desiccants (silica gel, molecular sieves or activated alumina) and cryogenics (including Joule-Thompson Expansion, with or without glycol), glycol dehydration is the most commonly used technology for natural gas drying. Glycol dehydration is a liquid desiccant system for the removal of water from natural gas and natural gas liquids (NGL). It is the most common and economical means of water removal from these streams. Glycols typically seen in industry include triethylene glycol (TEG, BP=285° C.), diethyleneglycol (DEG, BP=245° C.), monoethyleneglycol (MEG, BP=197° C.), and tetraethylene glycol (TREG, BP=314° C.). TEG is the most commonly used glycol in industry for natural gas dehydration.

In a typical glycol dehydration system, lean, water-free glycol (purity >99%) is fed to the top of an absorber (also known as a "glycol contactor") where it is contacted with the wet natural gas stream. The glycol removes water from the natural gas by physical absorption and is carried out the bottom of the column. Upon exiting the absorber the glycol stream is often referred to as "rich glycol". The dry natural gas leaves the top of the absorption column and is fed either to a pipeline system or to a gas plant. Glycol absorbers can be either tray columns or packed columns. After leaving the absorber, the rich glycol is fed to a flash vessel where hydrocarbon vapors are removed and any liquid hydrocarbons are skimmed from the glycol. This step is necessary as the absorber is typically operated at high pressure and the pressure must be reduced before the regeneration step. Due to the composition of the rich glycol, a vapor phase having a high hydrocarbon content will form when the pressure is lowered.

After leaving the flash vessel, the rich glycol is heated in a cross-exchanger and fed to the stripper (also known as a regenerator). The glycol stripper consists of a column, an overhead condenser, and a reboiler. The glycol is thermally regenerated to remove excess water and regain the high glycol purity. The hot, lean glycol is cooled by cross-exchange with rich glycol entering the stripper. It is then fed to a lean pump where its pressure is elevated to that of the glycol absorber. The lean solvent is cooled again with a trim cooler before being fed back into the absorber. This trim cooler can either be a cross-exchanger with the dry gas leaving the absorber or an air-cooled exchanger.

Most glycol units are fairly uniform except for the regeneration step. Several methods are used to enhance the stripping of the glycol to higher purities (higher purities are required for dryer gas out of the absorber). Given that the reboiler temperature is limited to 400 F or less to prevent thermal degradation of the glycol, almost all of the enhanced systems center on lowering the partial pressure of water in the system to increase stripping. Common enhanced methods include the use of stripping gas, the use of a vacuum system (lowering the entire stripper pressure), the DRIZO process, which is similar to the use of stripping gas but uses a recoverable hydrocarbon solvent, and the Coldfinger process where the vapors in the reboiler are partially condensed and drawn out separately from the bulk liquid. Glycols are cheaper, as compared to solid desiccants: 50% less at flows of 10 MMSCFD and 53% less at 50 MMSCFD, while the pressure drop is only 5-10 psig, in comparison to 10-50 psig for solid desiccants (silica gel, molecular sieves or activated alumina). Glycols also require less heat for regeneration per pound of water removed. Glycol circulation rates are typically 2-3 gallons/lb of $H_2O$ removed. Once saturated with water, the glycols are heated to 100° C. to boil off the water in a separate loop, to regenerate the glycols for repeated use for water absorption. The energy requirements for such a system are quite high, due to the high heat of vaporization of water.

Polyethylene glycol (PEG) is an oligomer or polymer of ethylene glycol, and very soluble in water. The EO monomer exhibits polarity of the individual C—O bonds in the molecule, allowing for interaction with polar groups. Thus, the ethylene oxide (EO) monomer in a polyethylene glycol enables very easy hydrogen bonding with water molecules, resulting in the very high osmotic pressures exhibited by PEGs. The EO monomers in the glycol chain have very high hydrophilicity, and has also been used as osmotic agents in the desalination and bio-medical industries. Each EO monomer has a capacity for physically absorbing almost 2.75 molecules of water.

SUMMARY

The present invention comprises methods of reducing the water content of a wet gas using inventive solvents. In one set of embodiments, the method comprises exposing the gas to an amine-terminated branched polymer solvent, which solvent exhibits an osmotic pressure higher of about 175 atmospheres or higher, so as to remove a substantial portion of the water from the wet gas, resulting in a diluted solvent and a substantially dry gas, exposing the diluted solvent to carbon dioxide so as to create a phase separation of the solvent from the water, regenerating the solvent for reuse by desorbing the carbon dioxide by the application of heat; and directing the regenerated solvent to a new supply of wet gas for water reduction. If desired, the methods can also include directing the desorbed carbon dioxide to the diluted solvent for purposes of creating phase separation of the solvent from the water. In some embodiments, the solvent comprises an amine-terminated branched PEG. In some cases, the solvent comprises amine-terminated glycerol ethoxylate. In other cases, the solvent comprises amine-terminated trimethylolpropane ethoxylate. In yet other cases, the solvent comprises amine-terminated pentaerithritol ethoxylate. Combinations of one or more of the identified solvents are also contemplated.

In other embodiments, the method of reducing the water content of a wet gas comprises exposing the gas to a cloud-point glycol solvent, which solvent exhibits an osmotic pressure of about 75 atmospheres or higher, so as to remove a substantial portion of the water from the wet gas, resulting in a diluted solvent and a substantially dry gas, heating the diluted solvent up to or above a cloud point temperature for the solvent so as to create a phase separation of the solvent from the water so as to regenerate the solvent for reuse, and directing the regenerated solvent to a new supply of wet gas for water reduction. In some embodiments, the solvent comprises an ethoxylate polymer, such as one or more of linear polyethylene glycols with attached fatty acids, linear polyethylene glycols with attached fatty alcohols, branched polyethylene glycols with attached fatty acids, or branched polyethylene glycols with attached fatty alcohols. In other embodiments, the solvent comprises linear and branched polyethylene-polypropylene co-polymers. In yet other embodiments, the solvent comprises linear and branched polyethylene-polybutylene co-polymers. In still other embodiments, the solvent comprises linear and branched polypropylene glycol co-polymers. Combinations of one or more of the identified solvents are also contemplated.

BRIEF DESCRIPTION OF THE FIGURES

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF CERTAIN EMBODIMENTS

Figure 1:
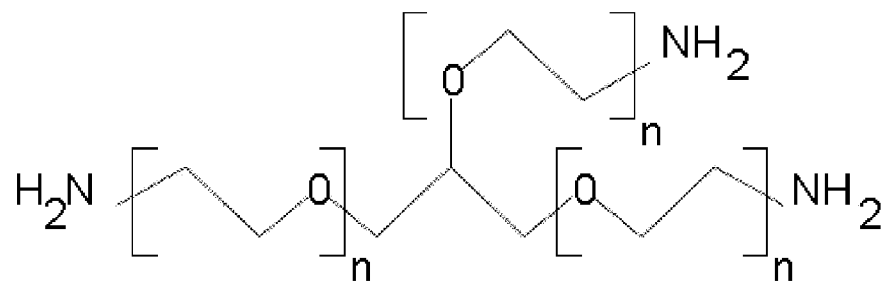
FIGS. 1, 2 and 3 show compounds useful at least some of the inventive methods presented herein.

Embodiments of the present invention comprise cloud-point glycols or thermo-sensitive polymers, which include a hydrophobic end attached to the polyethylene glycols. The hydrophobic end (commonly fatty acids, fatty alcohols, polypropylene glycols or polybutylene glycols) create a temperature-related solubility inversion, and thus, the copolymer exhibits water solubility at lower temperatures, but water immiscibility at higher temperatures. The transition temperature for water-immiscibility is usually called the "cloud point" temperature or the critical temperature. Above the transition temperature, the glycol co-polymer phase separates into a water-rich layer and a glycol-rich layer due to density differentials, and the two layers can easily be separated by decantation techniques. Some copolymers have both a lower and upper critical temperature—the copolymer becomes hydrophobic at the lower critical temperature, but becomes hydrophilic above the upper critical temperature.

The transition temperature is defined by the Hydrophilic-Lipophilic Balance (HLB) number of the co-polymer, with the higher the HLB number, the higher the cloud point. The energy requirement for water-glycol separation is essentially based on the specific heat of the water-glycol mixture, and the cloud point temperature. Since the water is not boiled off, the high heat of vaporization of water is not incurred in the energy consumption for glycol-water separation. Organic synthesis processes can create a multitude of polymers with fatty acids or bases, and/or copolymers with varying osmotic pressures and cloud points, based on the precursor molecules used. Reference is made to U.S. Pat. No. 8,021,553 issued to Iyer, the entire content of which is incorporated herein by reference.

The high water attraction and osmotic pressures exhibited by these copolymers can be used very energy-efficiently for water absorption from gas streams. Once saturated with water, the copolymer-water mixture can be separated by application of low-level heat, thereby inducing cloud-point gravity separation into distinct water-rich and polymer-rich fraction. The water-rich fraction can subsequently be passed through a nanofiltration (NF) membrane, wherein the water molecules permeate through the membrane at pressures of 200-250 psig. The copolymer molecules are retained by the small pore size of the nano-filtration membrane (typically 200 MWCO), since their molecular weights are well in excess of the 200 Daltons cut-off point of the NF membrane. The retained portion can now be re-mixed with the polymer-rich fraction for the next cycle of water absorption from the gas stream.

Several commercially available copolymers, with cloud-point temperatures from 45° C. to 75° C., are manufactured in industry, for use as surfactants or other applications. Accordingly, a commercially available cloud-point copolymer glycol, Pluronic 10R5, from BASF, synthesized from polyethylene and polypropylene glycols in an equi-molar proportion, was investigated for use in water absorption from a wet gas stream. Due to its high intrinsic osmotic pressure of 187 atm, 10R5 attracts and absorbs water to a high degree. The hydrophobic end (polypropylene glycols) of this cloud-point glycol causes a solubility inversion, and thus, the combined polymer exhibits water solubility at lower temperatures, but water immiscibility at higher temperatures. The results of the cloud-point testing of the 10R5 glycol are shown in Table 1.

TABLE 1

| | Cloud point phenomena of Pluronic 10R5 mixtures | | | |
| --- | --- | --- | --- | --- |
| | 100 ml solution; 10R5 % in $H_2O$ | Onset of Cloud Point | Cloud Pont complete | 10R5:$H_2O$ Phase separation |
| 1 | 90% | >80° C. | >80° C. | None |
| 2 | 75% | >80° C. | >80° C. | None |
| 3 | 50% | 64° C. | 73° C. | 80 and 20 |
| 4 | 25% | 59° C. | 67° C. | 25 and 75 |
| 5 | 10% | 57° C. | 61° C. | 8 and 92 |

As can be seen, a 25% mixture of Pluronic 10R5 in water phase separates completely into water-rich and polymer-rich layers, in the same proportion, at 67° C. Fresh 10R5 when injected into the wet gas stream will absorb up to three times its volume of water, at which point the water-glycol mixture can be removed, phase separated by thermal means using the cloud-point phenomena, and the glycol-rich solvent re-introduced into the water removal system. Assuming 2% moisture in the inlet gas stream, for a 100 SCFM system, condensation of two liters of water per hour of operation is needed, and an 8-hour run will result in 16 liters of water removal required. If initially, the system is started with 75 liters of pure 10R5, the polymer can absorb three times its volume of water, i.e., 225 liters of water, equivalent to 14 days of operation at eight hours per day. At the end of the 14-day period, 300 liters of the water-polymer mixture can be removed, phase separated by thermal means using the cloud-point phenomena, and after suitable filtration, the glycol-rich solvent re-introduced into the water removal system.

The thermal energy needs for replenishing the liquid desiccant are much lower than the conventional glycols (TEG, MEG, DEG and TREG) used commonly for dehydration of natural gas. Since no water needs to be boiled off, and cloud-point polymer-water separation is well below the boiling point of water, energy requirements are lowered by almost 75%, as compared to conventional liquid desiccant systems using conventional ethylene glycols. The cloud-point glycols exhibit greater water attraction and osmotic pressures are compared to the simpler ethylene glycols, and hence lower volumes of the cloud-point glycols are needed for dehydration of gases.

While the commonly used PEGs used in these copolymers are linear in structure, and increase in melting point and viscosity as the chain-length increases, there are other forms of PEGs available, with different geometries, which are termed branched or multi-armed PEGs. Branched PEGs have 3-10 PEG chains emanating from a central core group. Star PEGS have 10 to 100 PEG chains emanating from a central core group, while comb PEGs have multiple PEG chains grafted onto a polymer backbone. Such branched PEGs allow more EO groups in the polymer, while remaining in the liquid state and having lower melting points and viscosity than comparable linear PEGs with the same number of EO monomers. The use of such PEG geometries can enable higher water absorption, while retaining the practicality of using higher number of EO monomers for water molecule interaction by hydrogen bonding.

Branched PEGs can be synthesized from glycerol (3 arms), trimethylolpropane (4 arms, though one of the arms has a methyl group), pentaerythriol (4 arms) and other organic compounds. Some simple branched PEGs commercially available are glycerol ethoxylates (GE), trimethylolpropane ethoxylates (TMPE) and pentaerythriol ethoxylates (PEE). Glycerol ethoxylate, with a molecular weight of 1000, has approximately 20 EO groups, but is a liquid at room temperature, and less viscous than PEG 300 (EO=6). Trimethylolpropane ethoxylate, with a MW of 1014, also has 20 EO groups, is liquid at room temperatures, and also less viscous than PEG 300. Other liquid branched ethoxylates include pentaerythriol ethoxylate, MW 270 (EO=3) and pentaerythriol ethoxylate, MW 797 (EO=15). All of these ethoxylates have terminal [—OH] groups, except for the TMP ethoxylates, which have one terminal methyl group replacing one [—OH] group, out of the four available. Branched PEGs also have advantageous properties of steric hindrance, exhibit lower viscosity than comparable linear PEGs, thus enabling better absorption of water in the FO process. All of these branched PEGs exhibited very high osmotic pressures, around 200-300 atms, and thus are very suitable as osmotic agents or for water absorption.

Another interesting property of the PEG molecules is their propensity to also absorb carbon dioxide. Although $CO_2$ is a non-polar molecule, it can act as a Lewis acid or a Lewis base and can participate in hydrogen bonding. Thus, the acid-base reactions of the acidic carbon dioxide with the electron-rich ether oxygen in the PEG molecule enable high solubility of $CO_2$ in PEGs. The terminal [—OH] groups in the PEGs have an affinity for carbon dioxide molecules, resulting in improved electron interaction with the bonds in the carbon dioxide molecule. Both the above interactions, namely the electron-rich ether oxygen in the PEG molecule, and the terminal [—OH] groups at the end of the PEG molecules, result in higher carbon dioxide solubility. Thus, PEGs show higher absorption capacity for $CO_2$ than the physical solvents like polyethylene glycol dimethyl ethers (the latter are end-capped with methyl groups, instead of the —OH group in PEGs) used by industry. Also, the greater the number of EO monomers in the PEGs, the greater would be the $CO_2$ absorption. Thus, higher chain-length liquid PEGs show higher $CO_2$ absorption than smaller chain-length PEGs.

Given the propensity for $CO_2$ absorption of the EO monomers in the physical solvents described above, as well as the superior absorption characteristics of amine-based solvents for $CO_2$ and $H_2S$, a new class of solvents, based on aminated branched polyethylene glycols, is postulated herein. Such a solvent consists of a branched polyethylene glycol, the ends of which have amine molecules attached, instead of [—OH] molecules. The EO monomers are capable of both coordination with water molecules, and physically absorbing acid gases like $CO_2$ or $H_2S$. The branched nature of the polymer keeps the solvent liquid and with low viscosity, while maximizing the number of EO monomers for water or acid gas molecular absorption, and the end-capping with amine molecules also enables chemical absorption of the acid gas molecules in a mole-to-mole ratio. In addition, the entire structure of the branched polyethylene glycol amine-terminated molecule is rendered water-soluble, due to both the large number of EO monomers and the amine ends.

Figure 2:
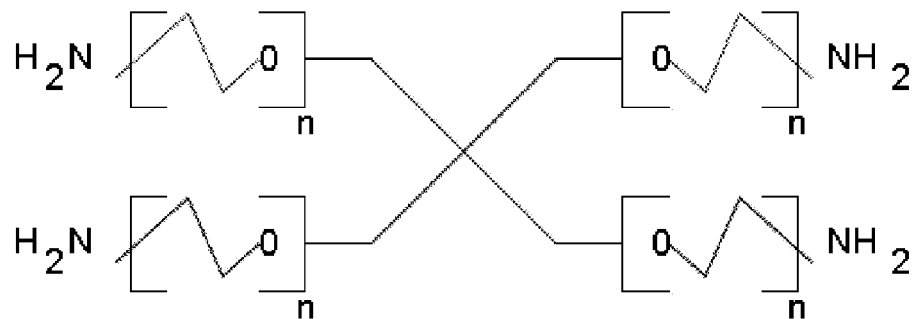
Figure 3:
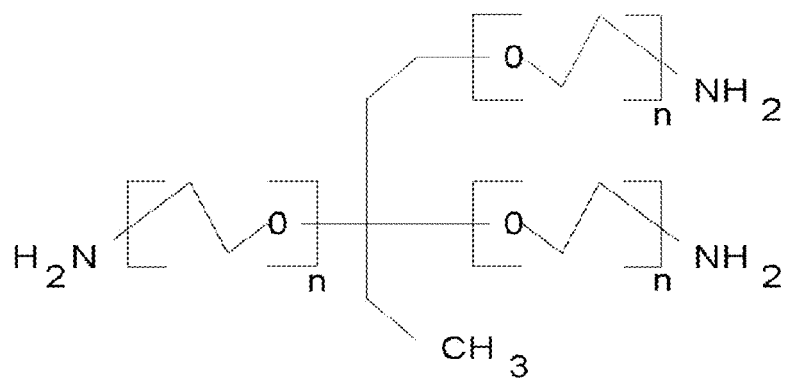

The synthesis of such amine-terminated branched ethoxylates is fairly simple. One methodology used is as follows: glycerol ethoxylate is reacted with diethylene triamine in the presence of acid catalyst at 95°-100° C. in an inert atmosphere. The DETA quantity can be varied depending on requirements, with the maximum amount being 3.3 moles to 1 mole of Glycerol Ethoxylate. Although other amines can be used, diethylene triamine has some advantages in that it provides greater stability to the amine functionality. Amine-terminated glycerol ethoxylate, pentaerithritol ethoxylate, and trimethylolpropane ethoxylate were synthesized in the above manner and tested for $CO_2$ absorption. Their molecular structure is shown in FIGS. 1, 2 and 3, respectively. In that regard, reference is made to U.S. patent application Ser. No. 15/271,175 filed Sep. 20, 2016 by Iyer, the entire content of which is hereby incorporated by reference, which describes in some detail branched PEGS, including those contemplated for use in the applications presented herein.

An additional physical phenomenon was discovered during the absorption of $CO_2$ by aqueous solutions of these amine-terminated branched polymers. Before the absorption of carbon dioxide gas was performed, these polymers were completely soluble in water. However, after absorption of $CO_2$, the aqueous polymer solution formed a two-phase mixture, clearly separated from each other—an amine-rich phase and a water-rich phase, in roughly the same proportions used for the original water-polymer mixtures. Both the amine-terminated glycerol ethoxylate and the amine-terminated pentaerythritol ethoxylate exhibited the same phenomena for complete water solubility before $CO_2$ absorption and complete insolubility with water after $CO_2$ absorption.

An important feature of the inventive solvents contemplated herein is their capacity to exhibit very high osmotic pressures. They can absorb large amounts of water, and can be used effectively as a draw solution in a forward osmosis system. Osmotic pressure tests were performed over 24 hours, by balancing various concentrations of the synthesized chemicals against varying concentrations of $MgCl_2$ solutions, separated in a U-tube fixture by a HTI CTA FO (cellulose triacetate forward osmosis) semi-permeable membrane. An aqueous solution of 95% w/w of all these chemicals exhibited an osmotic potential of greater that 150 atms at 25° C., and drew water from both 20% and 18% $MgCl_2$ solutions.

The above phenomena of phase separation from water after gas absorption has important implications for practical use of these chemicals in both seawater desalination and $CO_2$ absorption, and major advantages in energy consumption for regeneration of these solvents. Since the amine-terminated branched polymers phase separate from water after gas absorption, the water-rich portion can be removed by filtration, and only the polymer-rich portion needs to be heated up to desorb the absorbed acid gas. Typical temperatures for desorption of $CO_2$ from these amine-terminated branched PEGs is around 60° C., thus efficiently regenerating the polymers for use in the next cycle of forward osmosis.

Osmotic pressures were computed for several synthesized amine-terminated branched ethoxylates against various concentrations of $MgCl_2$ solutions. The results are shown in Table 2 below. The high osmotic pressures exhibited by the synthesized amine-terminated branched ethoxylates can be advantageously used as water absorption liquid desiccants, and the additional property of high $CO_2$ absorption (and phase separation from water on $CO_2$ absorption) can be used for both water removal from gas streams.

TABLE 2

Observed osmotic pressures of various synthesized chemicals

| Chemical name | GE1000-3NH$_2$, Glycerol ethoxylate, amine-terminated | GE1200-3NH$_2$, Glycerol ethoxylate, amine-terminated | TMP470-3NH$_2$, Trimethylol-propane amine-terminated | PET797-4NH$_2$, Penta-erythrotol, amine-terminated |
|---|---|---|---|---|
| Osmotic pressure of 95% aqueous solution | 270 atms | 285 atms | 175 atms | 245 atms |

Figure 4:
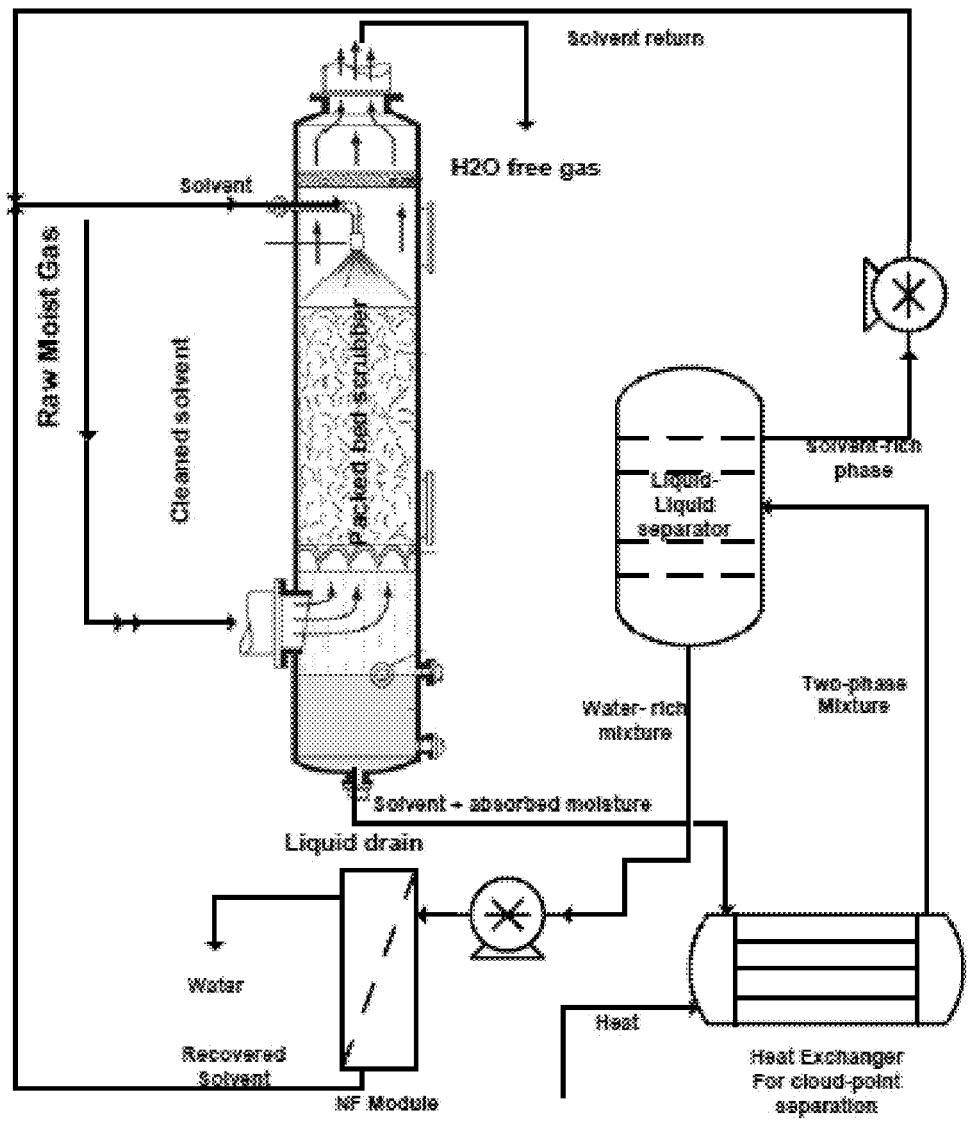
FIG. 4 shows a schematic of one embodiment of the inventive methods presented herein.
Figure 5:
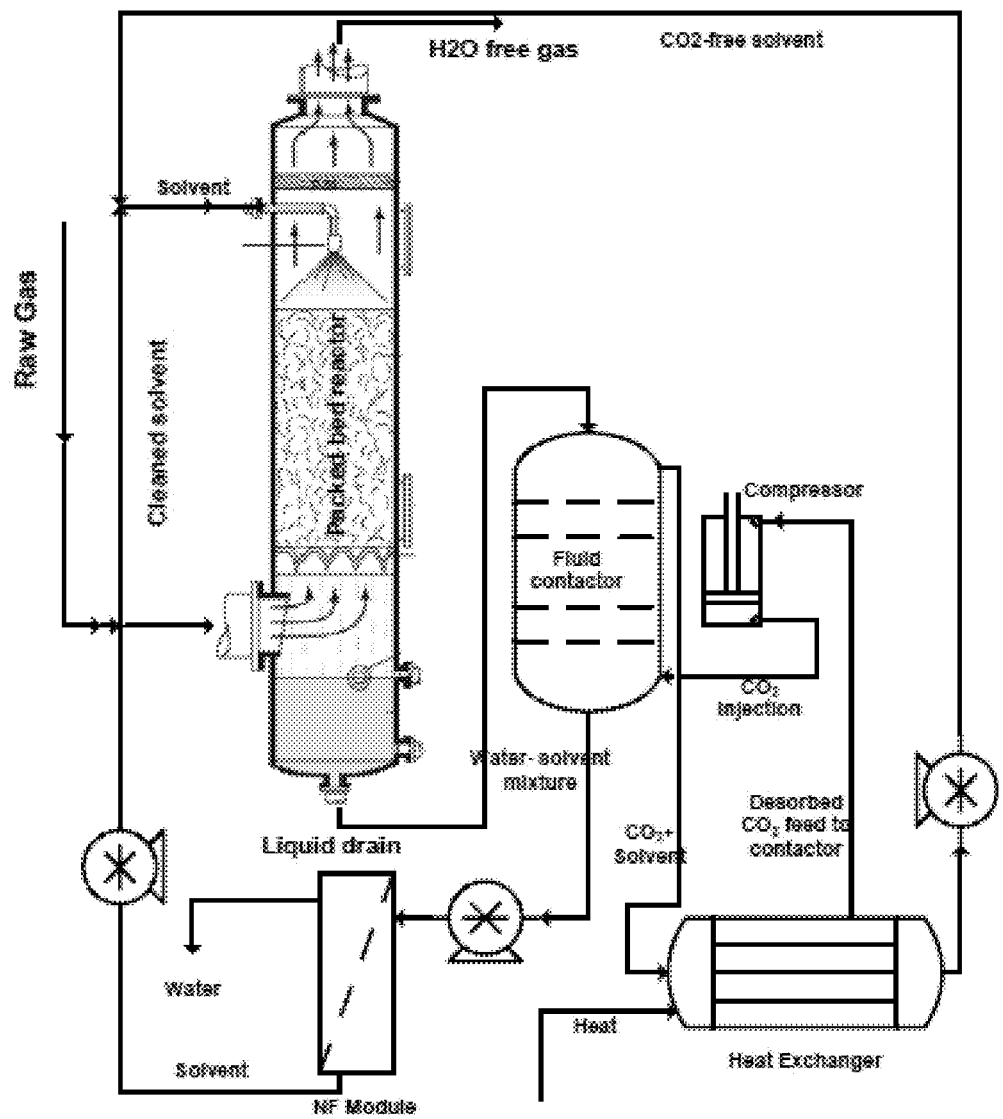
FIG. 5 shows a schematic of another embodiment of the inventive methods presented herein.

Applications of the inventive solvents for use in moisture reduction of wet gases can be further appreciated with reference to FIGS. 4 and 5. Referring specifically to FIG. 4, for example, raw moist gas enters a packed bed scrubber, wherein the gas is intimately mixed with a cloud-point glycol. The cloud-point glycol, having a high intrinsic osmotic potential, has the ability to absorb large quantities of moisture from the gas stream, thus drying the gas before it exits the scrubber. The cloud-point glycol-water mixture is then directed to a heat exchanger, wherein the temperature of the mixture is raised up to or above its cloud-point temperature, enabling phase separation of the glycol from its water mixture. The two-phase mixture is then directed to a liquid-liquid separator, wherein the two phases are able to separate by gravity into two distinct fractions. The water-rich fraction is pumped at high pressure through a nano-filtration membrane, wherein any remaining polymer is extracted as the retentate, while the water permeates the membrane and is used as needed. The polymer fraction from the liquid-liquid separation is mixed with the polymer retentate stream and redirected into the packed bed scrubber for further absorption of moisture from wet gas. Other system configurations are contemplated.

Referring to FIG. 5, by example, an alternative process using amine-terminated branched glycols can be used at facilities where flue gas or carbon dioxide is available. The amine-terminated branched glycol solvent is intimately mixed with the feed gas containing moisture to be removed in the packed bed scrubber, wherein the solvent preferentially absorbs all the water vapor in the feed gas. The solvent, now saturated with moisture, is now directed to a fluid contactor, wherein a $CO_2$ gas stream is fed in (in the case of amine-terminated branched ethoxylates). $CO_2$ absorption (for amine-terminated branched ethoxylates) causes the polymers to substantially separate out from the water component in the mixture as two distinct liquid phases. The polymer, now rich with $CO_2$ as the absorbed gas, is then directed to a heat exchanger where it is exposed to heat, desorbing the $CO_2$, at temperatures above 60° C., for recirculation to the fluid contactor for the next cycle of phase separation of the water-polymer mixture obtained from the feed gas-solvent scrubber. The water-rich phase is directed to a separation system, like a nano-filtration membrane, wherein all the polymer is recovered as a retentate, and the absorbed water separated. The polymer-rich phase is therein mixed with the retentate from the separation system and used for the next cycle of moisture absorption from the gas stream.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method of reducing the water content of a wet gas, the method comprising:
 exposing the gas to an amine-terminated branched polymer solvent, which solvent exhibits an osmotic pressure of about 175 atmospheres or higher so as to remove a substantial portion of the water from the wet gas, resulting in a diluted solvent and a substantially dry gas;
 exposing the diluted solvent to carbon dioxide so as to create a phase separation of the solvent from the water;
 regenerating the solvent for reuse by desorbing the carbon dioxide by the application of heat; and
 directing the regenerated solvent to a new supply of wet gas for water reduction.

2. The method of claim 1, wherein the solvent comprises an amine-terminated branched PEG.

3. The method of claim 2, wherein the solvent comprises amine-terminated glycerol ethoxylate.

4. The method of claim 2, wherein the solvent comprises amine-terminated trimethylolpropane ethoxylate.

5. The method of claim 2, wherein the solvent comprises amine-terminated pentaerithritol ethoxylate.

6. The method of claim 1, further comprising directing the desorbed carbon dioxide to the diluted solvent for purposes of creating phase separation of the solvent from the water.

7. A method of reducing the water content of a wet gas, the method comprising:
 exposing the gas to a cloud-point glycol solvent, which solvent exhibits an osmotic pressure of about 75 atmospheres or higher so as to remove a substantial portion of the water from the wet gas, resulting in a diluted solvent and a substantially dry gas;
 heating the diluted solvent to above a cloud point temperature for the solvent so as to create a phase separation of the solvent from the water so as to regenerate the solvent for reuse; and
 directing the regenerated solvent to a new supply of wet gas for water reduction.

8. The method of claim 7, wherein the solvent comprises an ethoxylate polymer.

9. The method of claim 8, wherein the solvent comprises one or more of linear polyethylene glycols with attached fatty acids, linear polyethylene glycols with attached fatty alcohols, branched polyethylene glycols with attached fatty acids, or branched polyethylene glycols with attached fatty alcohols.

10. The method of claim 7, wherein the solvent comprises linear and branched polyethylene-polypropylene co-polymers.

11. The method of claim 7, wherein the solvent comprises linear and branched polyethylene-polybutylene co-polymers.

12. The method of claim 7, wherein the solvent comprises linear and branched polypropylene glycol co-polymers.

\* \* \* \* \*